United States Patent

Metselaar

[11] 4,026,981
[45] May 31, 1977

[54] METHOD OF MANUFACTURING A PHOTOMAGNETIC MATERIAL HAVING GARNET STRUCTURE

[75] Inventor: Rudolf Metselaar, Eindhoven, Netherlands

[73] Assignee: U.S. Philips Corporation, New York, N.Y.

[22] Filed: Mar. 28, 1974

[21] Appl. No.: 455,788

[30] Foreign Application Priority Data

Apr. 17, 1973 Netherlands .................... 7305333

[52] U.S. Cl. .................................. 264/66; 106/65; 252/62.57; 264/61; 264/65
[51] Int. Cl. ......................................... C04b 35/64
[58] Field of Search ................ 264/66, 56, 332, 61, 264/65; 252/62.57; 106/65

[56] References Cited

UNITED STATES PATENTS 3,764,643  10/1973  Muta et al. ..................... 264/65

*Primary Examiner*—Donald J. Arnold
*Assistant Examiner*—John Parrish
*Attorney, Agent, or Firm*—Frank R. Trifari; Carl P. Steinhauser

[57] ABSTRACT

A method of manufacturing a magnetizable polycrystalline material having garnet structure for an active element whose magnetic properties can be influenced by exposure to light, in which a powder having garnet composition is compressed to form a body and is sintered in an oxygen-containing atmosphere, the sintered body being afterfired at a temperature between the sintering temperature and 800° C for a period between 1 and 240 hours and under an oxygen pressure which is smaller than the oxygen pressure during sintering.

5 Claims, 1 Drawing Figure

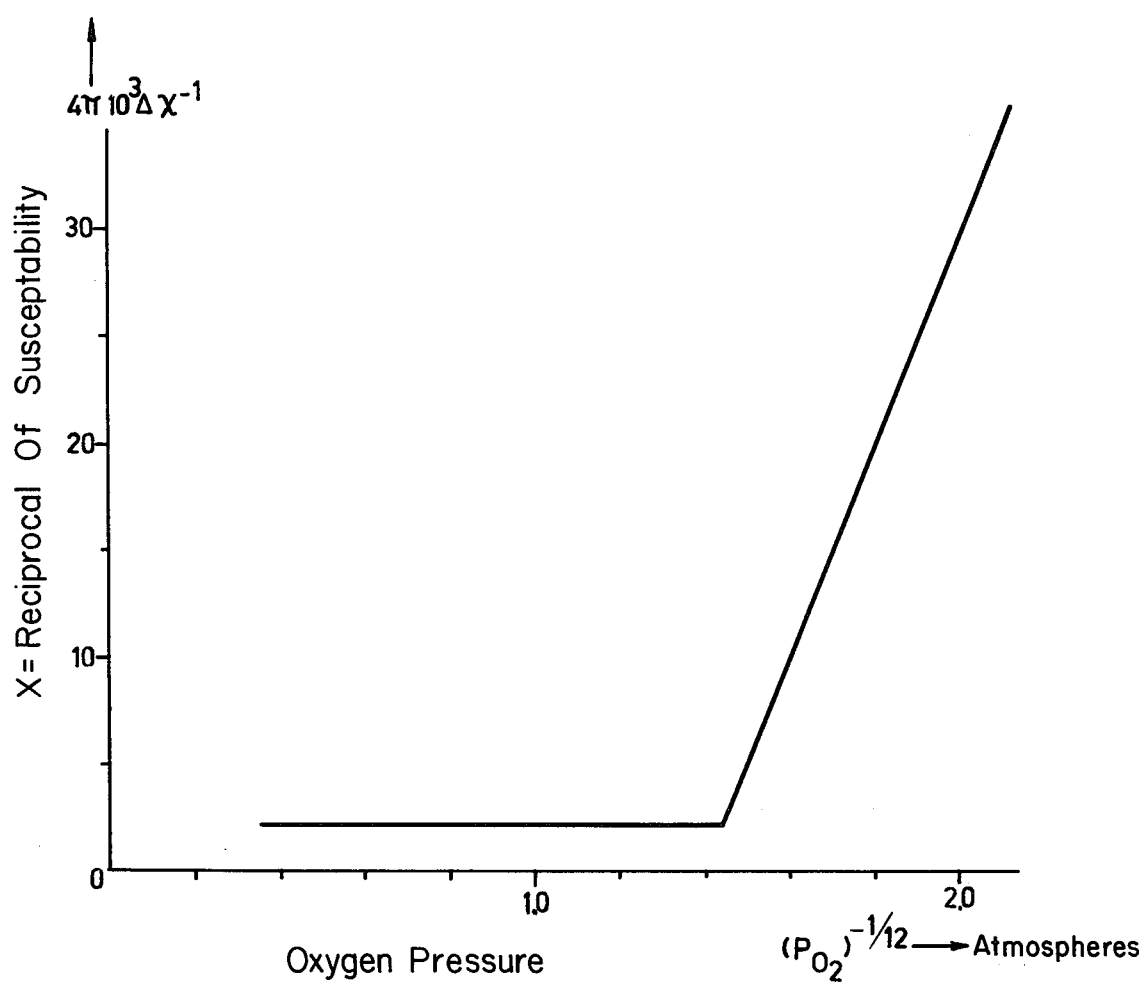

METHOD OF MANUFACTURING A PHOTOMAGNETIC MATERIAL HAVING GARNET STRUCTURE

The invention relates to a method of manufacturing a magnetisable polycrystalline material having garnet structure for use as an active element whose magnetic properties can be influenced by exposure to light, in which a powder having garnet composition is compressed to form a body and is sintered in an oxygen-containing atmosphere.

That changes in the magnetic properties of certain materials can occur under the influence of exposure to light has first been measured in yttrium-iron garnet which contained a small quantity of silicon. It was assumed that the addition of silicon introduced $Fe^{2+}$ ions so that the composition of the material may be written as $Y_3 Fe_5^{3+}-\delta-\epsilon (S\delta Fe\epsilon^{2+}) O_{12}$ and that the measured effects (a decrease of the magnetic permeability and an increase of the coercive force, respectively) are the result of a valency exchange between $Fe^{2+}$ ions and $Fe^{3+}$ ions caused by photons. (See, for example, British Patent Specification No. 1,227,748). This phenomenon which is known as the photomagnetic effect can be used in various manners, for example, for detecting radiation or the storage of information. It is desired, however, that the change in the magnetic properties of an active element produced by exposure to light be as large as possible, while it is moreover desired that the value of the change can be adjusted previously in order that a large number of active elements with mutually the same photomagnetic properties can be manufactured.

It is the object of the invention to provide a method of manufacturing active elements as described above, with which the said wishes are met. For that purpose, the method according to the invention is characterized in that the sintered body is afterfired at a temperature between the sintering temperature and 800° C for a period between 1 and 240 hours and under an oxygen pressure which is smaller than the oxygen pressure during sintering.

It has been found that the value of the photomagnetic effect is a function of the oxygen pressure during afterfiring the sintered material, and in particular that the value of the effect increases when the oxygen pressure decreases.

It is the object of the afterfiring to cause oxygen to disappear from the material. The lower limit of the afterfiring temperature is determined by the period of time which the afterfiring may last. Below 800° C the diffusion of the oxygen proceeds so slowly that the required afterfiring time would become too long. Afterfiring is preferably carried out above 1100° C because the afterfiring time in that case is economically justified. The upper limit of the afterfiring temperature depends upon the sintering temperature. When afterfiring is carried out at temperatures above the sintering temperature, undesired grain growth of the material occurs. The afterfiring temperature should preferably lie below 1350° C. Actually, when afterfiring is carried out above 1350° C and in combination with the required low oxygen pressures, decomposition of the material may occur.

The invention will be described in greater detail with reference to the drawing which is a graph in which the change $\Delta \chi^{-1}$ of the reciprocal susceptibility $\chi^{-1}$ produced by exposure to light is plotted as a function of the oxygen pressure $P_{O_2}$.

The starting material for a number of samples was manufactured by a wet-chemical process by means of spray-drying of sulphate solutions.

Yttrium sulphate was prepared by treating $Y_2O_3$ with sulphurous acid, ferrusulphate was prepared from very pure iron powder. The mixture obtained by spray drying was converted into an yttrium-iron garnet powder by heating at 1150° C in an oxygen-containing atmosphere. This powder was compressed to small blocks and sintered at 1430° C in oxygen under a pressure of 1 atmosphere for 6 hours. It is to be noted that the sintering may be carried out in pure oxygen but also, for example, in an air-oxygen mixture. Annular cores having an outer diameter of 3 mm, an inner diameter of 2 mm and a height of 1 mm were manufactured from the sintered blocks. Said annular cores were annealed at 1000° C in pure oxygen so as to remove mechanical stresses, if any, and the influence of exposure to light on the magnetic susceptibility $\chi$ was then determined at 77° K by measuring it prior to exposure ($=\chi_d$) and after exposure ($=\chi_b$) to the light of an unfiltered incandescent lamp.

The annular cores were then afterfired for different times at a temperature of 1200° C in a furnace through which nitrogen gas under a pressure of 1 atmosphere was led with different but each time constant small quantities of oxygen.

The afterfired annular cores were quenched from 1200° C to room temperature so as to prevent oxidation (as a result of oxidation the photomagnetic effect may disappear partly) and the influence of exposure to light on the magnetic susceptibility $\chi$ was again measured.

In the graph shown in the FIGURE the light induced variation of the reciprocal susceptibility for one core (expressed as $4\pi .10^3 \Delta \chi^{-1}$) is plotted against a power of the reciprocal oxygen pressure upon afterfiring (expressed as $(P_{O_2})^{-1/12}$). It may be seen that the value of the photomagnetic efect is significantly dependent upon the value of the oxygen pressure during afterfiring. It is found that said dependence occurs in particular with oxygen pressures smaller than 0.2 atmosphere. The other cores showed a corresponding behaviour.

It was found that no variation in the value of the photomagnetic effect occurs when afterfiring is carried out in oxygen at pressures between 1 and 80 atmospheres.

The above proves that the value of the photomagnetic effect can be adjusted by choosing during the afterfiring a given oxygen pressure smaller than 1 atmosphere. The reproducibility of this method is shown in the following Table.

| Afterfiring condition | | | Photomagnetic effect | |
|---|---|---|---|---|
| time(hours) | temp(° C) | $P_{O_2}$(atm) | $\frac{\chi_d - \chi_b}{d}$ | $10^3 \cdot \Delta (4\pi\chi)^{-1}$ |
| nor | after-fired | | 0.60 | 27 |
| 24 | 1200 | 80 | 0.60 | 27 |
| 24 | 1200 | $10^{-5}$ | 0.90 | 175 |
| 24 | 1200 | 1 | 0.60 | 27 |
| 24 | 1200 | $10^{-5}$ | 0.90 | 175 |

This table should be interpreted as follows. The relative change of the susceptibility by exposure $$\left( = \frac{X_d - X_b}{X_d} \right)$$

of an annular core manufactured in the above-described manner was determined as well as the absolute value of the change of the reciprocal susceptibility by exposure (= $10^3 . \Delta (4 \pi \chi)^{-1}$). The core was then afterfired under the above conditions at oxygen pressures of successively 80 atmospheres, $10^{-5}$ atmospheres, 1 atmosphere and $10^{-5}$ atmospheres. Afterfiring at 80 atmospheres proves to have no influence. Afterfiring at $10^{-5}$ atmospheres increases the photomagnetic effect. Subsequent afterfiring at 1 atmosphere causes the original value of the photomagnetic effect to return. Subsequent afterfiring at $10^{-5}$ atmospheres causes the previously measured value after afterfiring at $10^{-5}$ atmospheres to return. So one always operates along a curve as is shown in the FIGURE.

It is to be noted that during afterfiring only the value of the oxygen pressure is of importance. How large the overall pressure is, is of no importance. For example, afterfiring may be carried out in a closed space which has first been evacuated and in which oxygen under a low pressure is then admitted. It is also possible to perform the afterfiring in an inert gas atmosphere to which a small quantity of oxygen has been added in such manner that the partial oxygen pressure is lower than 0.2 atmosphere.

What is claimed is:

1. In the method of manufacturing a magnetisable polycrystalline material of yttrium iron garnet for use as an active element whose magnetic properties can be influenced by exposure to light, in which a powder having said yttrium iron garnet composition is compressed to form a body and is sintered in an atmosphere having an oxygen pressure, of one atmosphere the improvement wherein the sintered body is afterfired at a temperature between 800° C and 1350° C said afterfiring temperature being less than the sintering temperature for a period between 1 and 240 hours and under an oxygen pressure which is smaller than said oxygen pressure during sintering to increase the photomagnetic effect in said material.

2. A method as claimed in claim 1, wherein the afterfiring temperature lies between 1100° C and 1350° C.

3. A method as claimed in claim 1, wherein the sintered body is afterfired in a closed space which has first been evacuated and which has then been filled with oxygen under a pressure lower than 0.2 atmosphere.

4. A method as claimed in claim 1, wherein the sintered body is afterfired in a gas mixture consisting of an inert carrier gas and of oxygen having a partial pressure lower than 0.2 atmosphere.

5. A method as claimed in claim 1, wherein the sintered body has the composition $Y_3Fe_5O_{12}$.

* * * * *